April 13, 1965   D. G. KILMARTIN ETAL   3,177,736
EARTH AUGER POWER DRIVING APPARATUS
Filed April 25, 1963   2 Sheets-Sheet 1

INVENTORS
DONALD G. KILMARTIN
BY BERNARD M. WHITED
John W. Adams
ATTORNEY

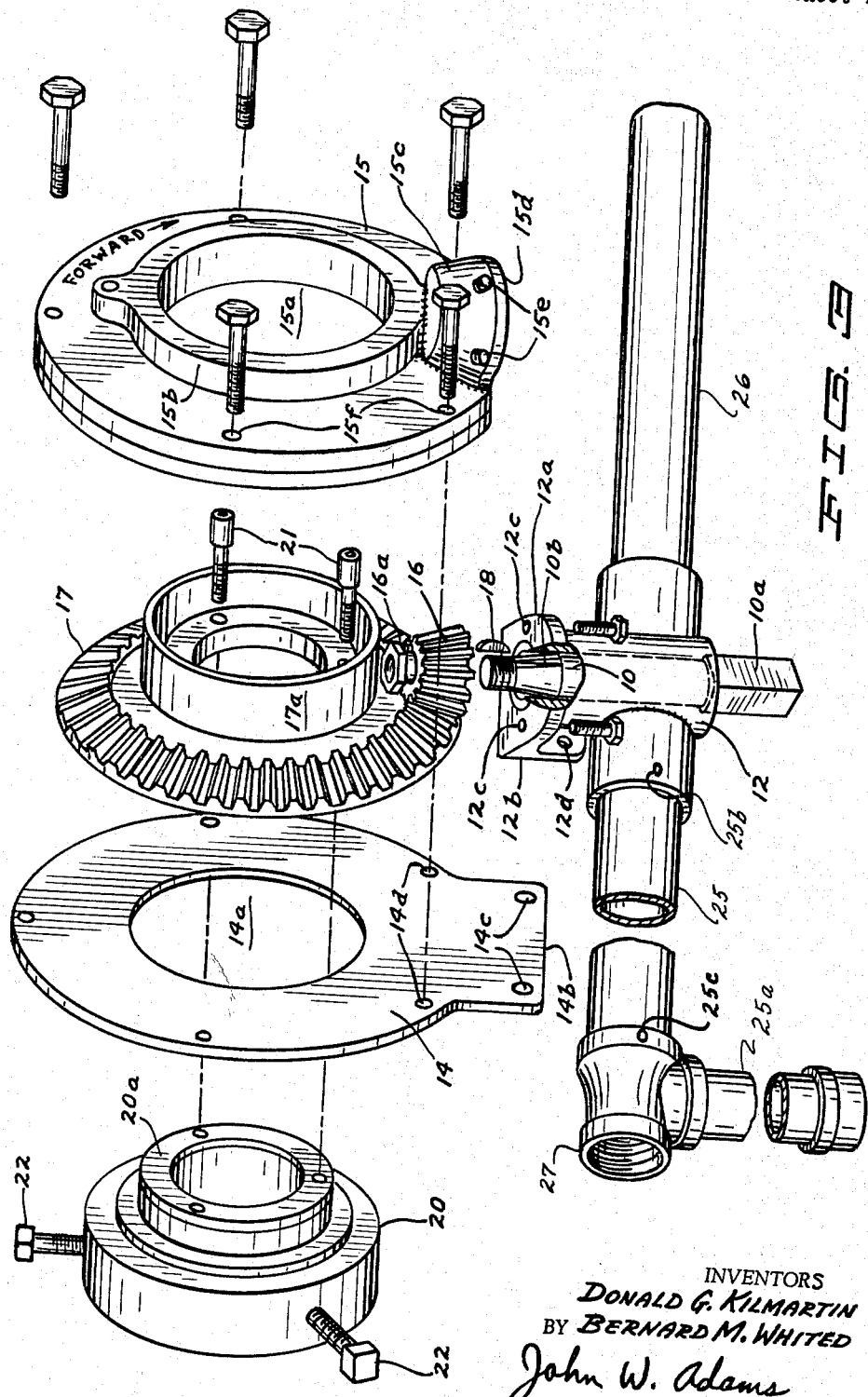

United States Patent Office 3,177,736
Patented Apr. 13, 1965

3,177,736
EARTH AUGER POWER DRIVING APPARATUS
Donald G. Kilmartin, 3940 40th Ave. S., Minneapolis, Minn., and Bernard M. Whited, Minneapolis, Minn., assignors, by mesne assignments, to said Donald G. Kilmartin
Filed Apr. 25, 1963, Ser. No. 275,692
7 Claims. (Cl. 74—417)

This invention relates generally to power driving apparatus for earth augers and more specifically to a portable power unit particularly adapted for driving anchoring poles in swamps soil.

In the construction of telephone and electric power lines, it is frequently necessary to put the supporting poles into swamp ground which requires the use of a swamp anchor to support the guide wires necessary to stabilize the poles in upright position. Since the ground is soft and will not support heavy loads such as truck drilling units, it has in the past been necessary to drill the swamp anchors into the ground by hand, which is difficult and time consuming work. It is also frequently desirable to drill anchoring posts or rods into the ground where it is difficult or impossible to drive a truck drilling unit and therefore a portable power drilling unit has many and varied uses for telephone and electric power companies.

In accordance with these requirements we have provided a driving mechanism having sufficient rotary power to drive an anchor into the ground and being portable so as to be particularly useful when anchors are being driven in unstable or swampy soil.

It is an object of this invention to provide a source of rotary power with means to transfer torque to a swamp anchor for driving the same into the ground.

It is a specific object of this invention to provide a gear reduction power transfer means for imparting rotary power to a ground anchor and driving the same into the ground.

It is a specific object of this invention to provide a source of rotary power connected to a geared driving mechanism, of which the driven element is provided with anchor engaging means and wherein rotational limit means are provided to absorb the counterrotational forces produced by the power source thus relieving the operator of this task and further decreasing any danger of injury to the operator during the drilling operation.

These and other objects and advantages of this invention will more fully appear from the following description made in connection with the accompanying drawings, wherein like reference characters refer to the same or similar parts throughout the views, and in which:

FIG. 3 is an exploded view showing the important structural elements of the invention.

Figure 1:
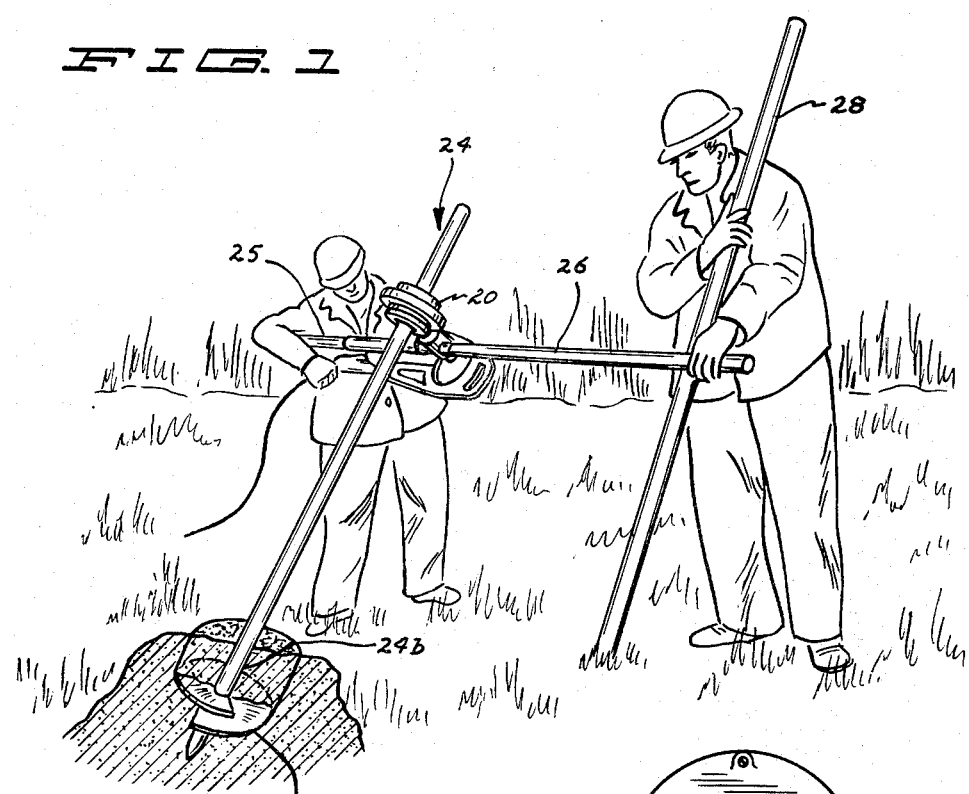
FIG. 1 is an illustrated sketch showing the use of the invention to drive a swamp anchor.

The particular unit as shown in the drawings incorporates a power head such as the electric motor 5 which supplies power to a speed reduction unit 6 which incorporates a worm and pinion unit of conventional design (not shown), a drive shaft 10 provided with a driving end 10a to be removably received in a cooperating recess provided in the speed reduction unit 6 to produce rotary power for the shaft. The shaft 10 is journaled in a suitable bearing housing designated in its entirety by the number 12 and having an attachment flange 12a on one side thereof with a second flange portion 12b disposed at right angles to flange 12a for purposes to be described hereafter.

A gear housing is formed by a pair of outer annular housing plates 14 and 15 and a chuck-driving ring gear 17 is journaled for rotation within said annular housing plates 14 and 15. The ring gear 17 has a bearing flange 17a fixed thereto and extends outwardly from one side thereof. The flange 17a is journaled within the central opening 15a of the casting 15, said casting having an enlarged boss area 15b which defines the opening 15a and provides bearing support for the flange 17a.

An annular attachment chuck designated in its entirety by the numeral 20 is provided and has an outwardly extending bearing element 20a on one side thereof to be received within the opening 14a of the housing plate 14 and provide a suitable bearing to permit rotation of said chuck with said ring gear 17. Suitable means for attaching the chuck and ring gear are provided, such as the allen bolts 21 illustrated. Suitable means for providing a driving connection between the chuck and the member to be driven are provide such as the set screws 22 illustrated.

In the form shown, the housing 15 has an enlarged boss portion 15c on one side thereof within which a pinion gear 16 is housed, said pinion meshing with the ring gear 17 and having a suitable driving connection with the shaft 10. In the form shown, the shaft has a keyway 10b and the inside of the pinion has a keyway 16a and a key 18 received in said keyways. The bearing housing 12 for the shaft 10 is secured to the gear housing formed by plates 14 and 15 as by bolts extending through the flange 12a which attach said flange to a mating flange 15d provided around the pinion gear housing 15c by means of bolts extending through the connecting flange 12b and a mating portion 14b of housing plate 14, the holes 12c registering with the holes 15e through the flange 15d, and the holes 12d matching the holes 14c.

The two plates 14 and 15 are secured together by means of bolts extending through respectively registering holes 14d and 15f provided therein.

A conventional swamp anchor 24 is illustrated and has the auger 24a thereon and a shaft 24b extending upwardly therefrom. The shaft 24b extends through the opening in the chuck 20 and is secured thereto as by the set screws 22. When driving torque is applied to the shaft 10 by the power source 5 through the reduction gear 6, a relative rotational force on the axis of the shaft 10 is produced as soon as resistance to rotation of the auger is applied by the drilling operation. This same resistance to rotation applied to the auger 24a will also tend to produce rotation of the power unit about the auger shaft 24b as an axis. Therefore, in order to apply the controlled rotational power to the shaft 24b, we have discovered that a convenient way of resisting both of these rotational forces is to attach a pair of laterally extending stabilizing arms to the shaft bearing housing 12 such as the arms 25 and 26. The arm 25 has a laterally extending stop arm 25a which engages an outwardly extending handle member 5a of the power source to positively prevent relative rotation between the power source and housing assembly about the axis of drive shaft 10. In order to accomplish this it is, of course, necessary to prevent axial rotation of the arm 25 relative to the shaft bearing housing 12. This is accomplished by a suitable pin connection 25b and a second pin 25c prevents axial rotation between the arm 25 and a T-coupling element 27 which attaches the stop arm 25a and the arm 25. The other arm 26 in the form shown extends outwardly in the opposite direction from the housing 12 and any suitable means for stabilizing the same may be provided such as engaging the outer end portion thereof with a fixed upright support such as a section of pipe 28 held against the ground surface or a fixed support of any other type. The arm 25 is extended outwardly by the extension member 25d to provide a suitable gripping element for the operator located adjacent the power head.

Figure 2:
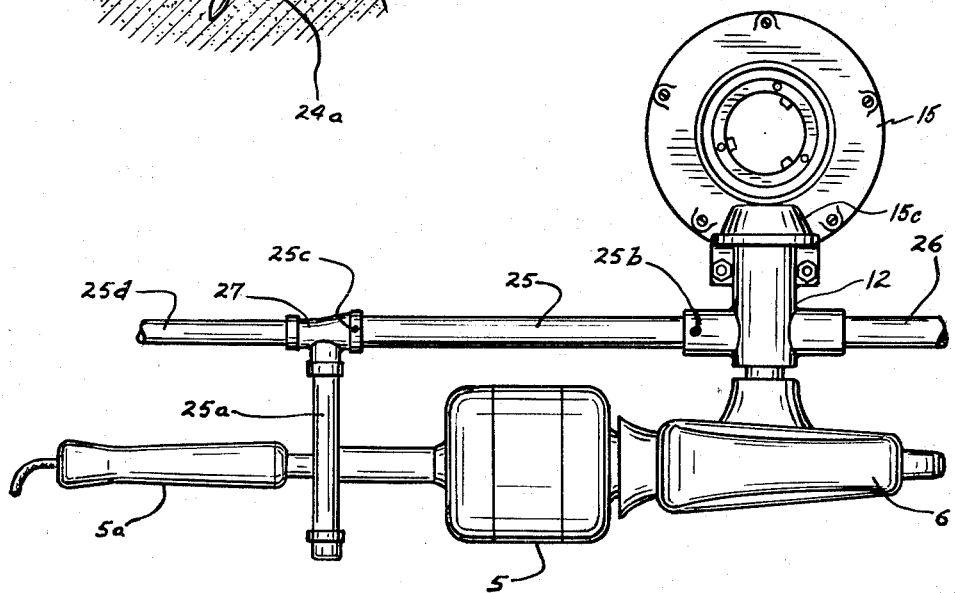
FIG. 2 is a partial plan view.

The following is a description of the operation of this invention. The shaft 24b is inserted through the annular chuck 20 and is secured thereto in centered relation therein by the set screws 22 at a convenient height for the operator. In the form shown the power source constitutes an electric motor 5 which is, of course, connected to a source of electrical power. This driving power is delivered through the reduction gear 6, the details of which are not shown, but which is of any conventional design, and from said reduction gear the driving power is transmitted to the chuck 20 through the drive shaft 10, bevel gears 16 and 17 and the anchoring bolts 21. The stabilizing arms 25 and 26, which extend radially of the axis of the shaft 10, permit the operator to prevent rotation of the power unit about the auger shaft 24b when driving power is applied thereto through the ring gear 17. Rotation of the power source about the axis of the shaft 10 is prevented by the offset stop arm 25a which engages the handle of the power source 5a as best shown in FIG. 2. The set screws 22 are readily accessible being disposed outside of the housing plate 14 as best shown in FIG. 3. When the anchor has been driven so that the chuck has moved down into close association with the ground surface, one of the set screws is loosened and the chuck is raised on the shaft 24b and the process repeated until the anchor 24 has been driven a sufficient distance into the ground to be securely anchored therein. It is, of course, conventional to attach additional shaft sections to the shaft 24 to provide the necessary length in order to insure secure anchoring of the auger portion 24a in solid subterranean soil material.

It will be seen that we have provided an extremely compact, easily portable, power driven unit particularly designed for use in driving augers into the ground with a minimum of effort being exerted on the part of the operators. While it is desirable to use two operators for maximum efficiency, it is apparent that one operator can handle the light weight unit by merely providing a fixed post for engagement with the outer end portion of the stabilizing element 26.

It will, of course, be understood that various changes may be made in the form, details, arrangements and proportion of parts without departing from the scope of our invention, which generally stated consists in the matter set forth in the appended claims.

What we claim is:

1. Rotary power driving apparatus for earth augers and the like having in combination an annular driving chuck with releasable means for connecting the same to an elongated auger shaft extending therethrough; a rotary power source unit; an offset driving connection between the chuck and the power source and comprising a ring gear fixed to said chuck concentrically thereof for driving the same, bearing means concentrically journaling said ring gear and chuck assembly, a driving pinion meshed with said ring gear, a stub shaft connected to said pinion for driving the same and extending outwardly of the ring gear in radially offset relation thereto, means establishing driving connection between the stub shaft and the power source, means preventing rotation of the power source about the axis of the stub shaft and means preventing rotation of the power source about the axis through said annular chuck.

2. The structure set forth in claim 1 and a housing surrounding said stub shaft, and both of said rotation preventing means comprising arm structures extending outwardly from said housing in fixed relation thereto and having a portion thereof engaging said power source unit.

3. Rotary power driving apparatus having an annular driving chuck with releasable means for connecting the same to an elongated auger shaft extending therethrough; rotary power source unit; an offset driving connection between the chuck and the power source and comprising a ring gear fixed to said chuck concentrically thereof for driving the same, bearing means journaling said ring gear and chuck assembly, a driving pinion meshed with said ring gear, a stub shaft connected to said pinion for driving the same and extending outwardly of the ring gear in radially offset relation, a speed reduction gear train connected to the stub shaft and to the power source, and an elongated stop arm extending radially from said annular chuck preventing rotation of said driving apparatus around said auger shaft so as to deliver rotational power from said source to said engaged auger shaft.

4. The structure as set forth in claim 3 and a second stop arm arranged to lie in a plane parallel to said stub shaft and communicating with said power source preventing rotation thereof about said stub shaft so as to deliver rotational power thereto.

5. The structure as set forth in claim 3 wherein said power source is removably attached to said stub shaft.

6. Rotary power driving apparatus having an annular driving chuck with releasable means for connecting the same to an elongated auger shaft extending therethrough; rotary power source unit; an offset driving connection between the chuck and the power source and comprising a ring gear fixed to said chuck concentrically thereof for driving the same, an annular bearing surface on one side of said ring gear and bearing means concentrically journaling said ring gear and chuck assembly, a driving pinion meshed with said ring gear, a stub shaft connected to said pinion for driving the same, a speed reduction gear train connected to the stub shaft and to the power source, an elongated stop arm extending radially from said annular chuck preventing rotation of said driving apparatus around said auger shaft so as to deliver rotational power from said source to said engaged auger shaft, a second stop arm arranged to lie in a plane parallel to said stub shaft and communicating with said power source preventing rotation thereof about said stub shaft so as to deliver rotational power thereto.

7. Structure set forth in claim 6 and thrust bearing means on the other side of said ring gear for journaling said ring gear and chuck assembly thereon.

References Cited by the Examiner
UNITED STATES PATENTS 1,401,780   12/21   Hensel _____ 74—417
2,761,300   9/56    Gredell _____ 74—417 X DON A. WAITE, *Primary Examiner.*